Nov. 24, 1931.    L. SPÄNGLER    1,833,443
BRAKE SYSTEM FOR ELECTRICALLY OPERATED VEHICLES
Filed Sept. 21, 1929    2 Sheets-Sheet 1

INVENTOR
Ludwig Spängler
by *Herbert J. Berton*
Attorney

INVENTOR
Ludwig Spängler
by Herbert J. Barth
Attorney

Patented Nov. 24, 1931

1,833,443

UNITED STATES PATENT OFFICE

LUDWIG SPÄNGLER, OF VIENNA, AUSTRIA

BRAKE SYSTEM FOR ELECTRICALLY OPERATED VEHICLES

Application filed September 21, 1929, Serial No. 394,280, and in Austria September 27, 1928.

My invention relates to brake systems for electrically operated vehicles, comprising two electric driving motors or two groups of cooperating motors. Whenever the current supply to such motors or motor groups is interrupted but the motors are closed upon themselves by special braking circuits, say by bringing the usual controller into the brake on position, the motors continue to run due to the inertia of the vehicles and of their own rotors, thereby generating electric flowing through the said braking circuits at the expense of vis viva of the vehicles and the rotors of the electric motors thus producing an efficient braking of the vehicles. This method of braking is fully satisfactory reliable as long as the braking circuits are in proper order, but if of the two braking circuits one is broken or otherwise fails for any reason whatever the braking action is reduced to about one half of its normal value wherefrom accidents may result.

The main object of my invention is to obviate such consequences of the said failing of any of the two braking circuits. With this object in view I connect to each of the said brake circuits a coil energized by the brake current in the said brake circuit or part of such current and elements such as a core or armature operated by such coil the said elements of the coils of the two brake circuits counteracting each other and being operatively connected to a separate brake apparatus comprising two parts each of such parts being associated to the vehicle wheels driven by one of the motor or motor groups whereby whenever the current in one of the said coils is in excess of the current in the other coil the part of the separate brake apparatus associated to the said other coil is thrown into action applying the brakes of the part of the separate brake apparatus to the wheels driven by the motor or group of motors associated to the said other coil and its brake circuit. Thus the decrease in brake action due to the failure of any one of the brake circuits is reduced or compensated for by the brake action of the part of the separate brake apparatus on the wheels driven by the motor or motor group the brake current of which is weaker.

In the annexed drawings I have diagrammatically shown by way of example various modifications of brake systems in accordance with the present invention.

Figure 1:
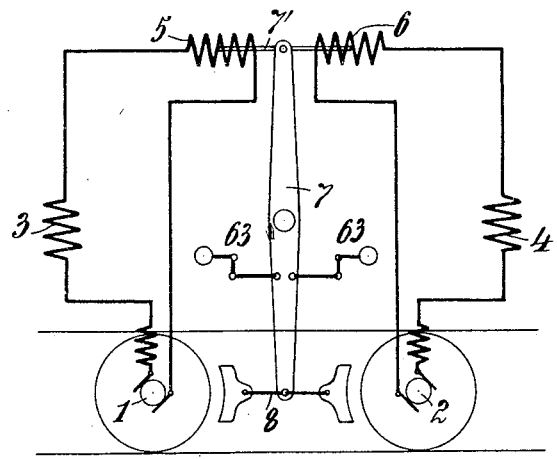
Fig. 1 is a diagrammatical view of a simple constructional form of my improved brake system.
Figure 2:
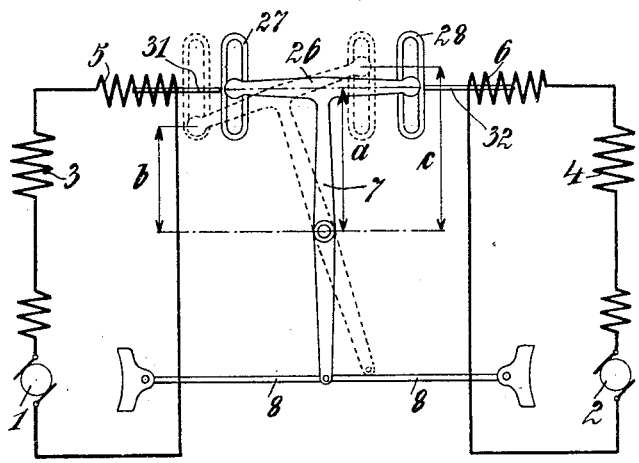
Fig. 2 illustrates a slight modification of the same.

In Fig. 1, 1 and 2 are two electric driving motors or groups of such motors of a vehicle which for the sake of simplicity are shown as series motors. When thrown into braking position by a controller not shown, each of the two motors is in a braking circuit including the usual control resistance, 3, 4. For the sake of clearness two braking circuits entirely separate the one of the other are shown in Fig. 1 although such braking circuit might be interconnected in any known or preferred manner. Moreover each of the brake circuits includes a solenoid coil 5 and 6 respectively.

The two solenoids counteract each other and have in common a core 7' connected to a member 7 of a separate brake apparatus for instance the brake lever of a mechanical brake link and lever gearing 8, 8. If now the braking current of one of the motors for instance 1 becomes stronger than that of the other motor 2 or if the braking circuit of the motor 2 is entirely broken for any reason whatever, then the solenoid 5 associated to the motor 1 attracts the core 7' and turns the lever 7 in such a direction, that link and lever gearing 8 applies the brake shoes of the separate brake apparatus to the vehicle wheels driven by the motor 1 that is to say to the vehicle wheels associated to the motor the braking current of which is unduly weakened. Normally the current intensity in the braking circuits of the two motors is at least approximately the same and hence the lever 7 remains at rest and the separate brake apparatus remains inoperative.

Since on weakening or interrupting the current in the braking circuit of one motor the other motor brings about the application of the separate brake apparatus to the vehicle wheels driven by the first named motor one may readily arrive at the result that notwithstanding the failure of one motor, or group of motors on the vehicle wheels associated to this motor substantially the same braking action is exerted as on the wheels driven by the other motor so that substantially the full braking action is obtained.

Instead of causing the solenoids 5, 6 and the core 7' to act directly on the lever 7 they might also act on the separate brake apparatus through the medium of any suitable mechanical or other relays or they might operate the control valves of vacuum or air pressure brakes, such intermediate devices are well known to persons conversant with the art and need not be more fully described and illustrated.

If a pair of wheels or a group of pairs of wheels are driven by a group of motors for instance the two pairs of wheels of a truck are each driven by a motor, the arrangement may be such that the motors of the group are connected in series when in the brake on position and that if one motor of the group fails to furnish the necessary braking current, brakes are applied to the associated group of pairs of wheels by an extraneous source of power.

The main advantage of the arrangement above described is its great simplicity and almost absolute impossibility of its getting out of order. It is only necessary to provide for each pair of wheels or group of pairs of wheels a separate braking apparatus adapted to apply brakes to the pair of wheels requiring separate braking. Such second braking apparatus may also be acted upon by the usual hand brake or an independent vacuum or air pressure braking apparatus suitably constructed.

It is not desired to throw into action the above described arrangement already at small differences of the intensities of the braking currents of the two motor or motor groups, the action of the coils on the lever or the action of the latter itself may be made lazy to the desired extent, say by springs.

It is preferable to provide optical or acoustical indicating devices, such as indicated at 63, Fig. 1, which indicate to the motor man to which pairs of wheels the separate brakes are applied in the manner indicated. The constructional details of such indicating devices are well known to experts and need not be more fully set forth.

In the arrangement just described it may happen, more particularly if in one of the braking circuits flows a current of a comparatively small but not negligible intensity, that the combined action of braking by the braking current and the separate brake apparatus causes the wheels to which the brakes are applied to slip whereby the braking action is notably reduced. This objectionable result may be obviated according to the invention by providing a mechanism which automatically reduces the leverage of the core or armature of the solenoid or coil tending to throw the lever 7 into the brake applying position whenever such lever follows the action of a brake current in one brake circuit exceeding that in the other brake current.

Fig. 2 illustrates diagrammatically such a mechanism.

1 and 2 are again the two motors or motor groups; 3, 4 are the controlling resistances in the brake circuits which also include the solenoids 5, 6 provided with cores 31 and 32 respectively. These cores are not directly connected to the lever 7 actuating the separate brake apparatus as in Fig. 1, but carry slotted arms 27, 28 respectively into which engage slidably the ends of a transverse arm 26 on the lever 7 actuating the link and lever gearing of the separate brake apparatus. If now the current intensity in the brake circuit of the motor 2 is reduced for any reason the pull of the solenoid 5 exceeds that of the solenoid 6 and the core 31 is pulled into the solenoid 5 whereby the lever 7 is turned and the separate brakes are applied to the wheels driven by the motor 2. Owing to the arrangement of the transverse arm 26, which in the position of rest is in line with the axes of the two solenoids the lengths of the lever arms on which act the cores of the solenoids are varied when the lever 7 is turned, while in the central position of the lever 7 the length of the lever arm for each of the two solenoids is represented by $a$ in the inclined position of the lever 7 shown in broken lines the lever arm for the solenoid 5 is represented by $b$ while that for the solenoid 6 is represented by $c$. Owing to the difference between the lever arms $b$ and $c$ the action of the solenoid 5 carrying the heavier brake current is the more reduced the further the core 31 is pulled into this solenoid and the further the lever 7 is turned.

Thereby not only the action of the separate brake apparatus is reduced, but also a peculiarity of the solenoid action is compensated for. This peculiarity consists in that the pulling force exerted by a solenoid on its core increases all other things being equal the further, within certain limits, the core is pulled into the solenoid and decreases as the core is pulled out of the solenoid. This peculiarity would result in the absence of the arrangement just described in an undue increase of the brake action of the separate brake apparatus since on throwing the latter into action the pull exerted by the solenoid 5 would continue to increase and that exerted by the solenoid 6 would continue to diminish; assuming of course that the current intensities in the two solenoids remain unaltered.

The arrangements hereinbefore described consist substantially in that each of the two brake currents flows through the coil of a solenoid whereby in case the two current intensities are unequal and more particularly that one of the brake circuits is broken the stronger pull of the one or the other solenoid actuates an element such as a brake lever connected to the core or cores of the solenoids and operatively connected to the separate brake apparatus whereby the separate brakes are applied to the wheels driven by the motor, the brake current of which is weaker or interrupted.

Figure 3:
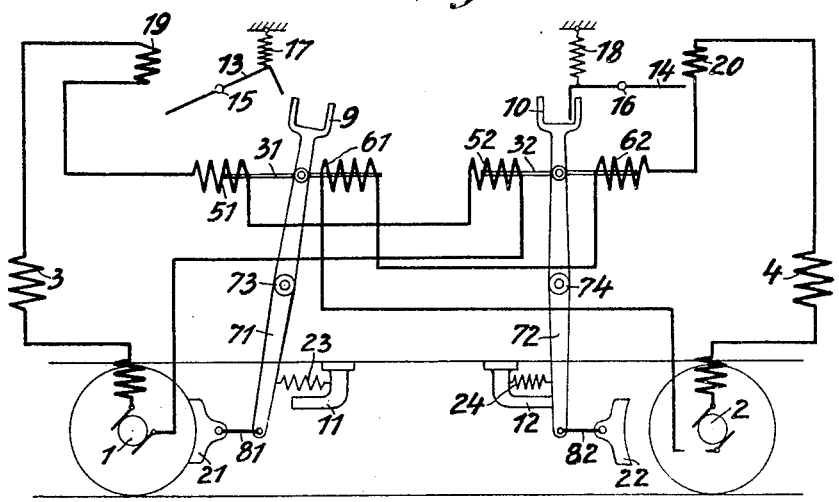
Fig. 3 illustrates a further modification of my improved brake system.

While this arrangement is quite satisfactory for short vehicles having two axles only each of which is equipped with one driving motor or group of motors the application of the same to long vehicles with two trucks each equipped with a driving motor or group of motors meets with serious constructional difficulties which are still greater in the case when the motor or motor groups are mounted on separate vehicles constituting coupled twin tractors coupled or not with trailers. In order to enable the present invention to be applied readily in such cases too I simply duplicate this arrangement as shown in Fig. 3, which shows two coupled tractors each comprising one driven axle only.

Each of the tractors is shown to be provided with one motor 1 and 2 respectively; the brake circuits of the two tractors include each a solenoid 51 and 62 on such tractor and two solenoids 52 and 61 on the other tractor. The solenoids 51 and 52 on the one hand and 61 and 62 are connected in series, so that the current intensities in the solenoids so connected are at all times exactly the same. The solenoid 51, 61 act in opposition to each other on a core 31 common to them and the solenoids 52, 62 act in opposition to each other on a core 32 common to them. Each of the cores 31, 32 acts through the medium of a suitable gearing indicated by a simple lever 71 and 72 respectively or through the medium of suitable relays on a separate brake apparatus 21, 22 respectively of the tractor, carrying the respective core.

Whenever in case of electric braking as above referred to the current intensities in the brake currents of the two motors 1 and 2 are exactly or substantially equal the two cores 31, 32 remain at rest since the solenoids 51, 61 and 52, 62 respectively exert on the same equal forces in opposite directions, so that the separate brake apparatus is not thrown into operation. If, however, one of the brake currents, for instance that of the motor 1 is interrupted or is notably weaker than that of the motor 2 the core 31 will be pulled to the right as shown in Fig. 3 under the action of the coil 61 and the separate brake apparatus 21 of the tractor or vehicle 1 will be thrown into action. In the second tractor the solenoid tends to pull the core 32 in a direction for releasing the second brake 22 of this second tractor which, however, is superfluous since this second brake is already released. Therefore the movement of the element 72 in the direction for releasing the second brake 22 may be limited by a stop 12. Thereby I avoid that the distance between the brake shoes and wheel rims of the tractor becomes unduly great. When the brake current of the motor 2 becomes notably less than that of the motor 1 or is interrupted the core 32 will apply the second brake of the second tractor and the core 31 of the first tractor will be moved by the solenoid 51 in a direction for releasing the second brake 21 unless the element 71 be arrested by a stop 11. Therefore in any case whenever the brake current of a motor or group of motors should fail the second brakes will be applied to the wheels driven by such motor or group of motors by the action of the brake current of the other motor or group of motors, while the second brakes of the wheels driven by the said other motor or group of motors remain released.

Although the above arrangement has been described as applied to a twin tractor comprising two coupled motor vehicles each equipped with a motor or group of motors it can obviously be also applied to any vehicle equipped with two motors the second brake apparatus comprising two parts each of which is associated to the wheels driven by one motor or motor group, in case of vehicles on trucks the two parts of the second brake apparatus are entirely independent of any displacements of such trucks relatively to each other.

In electrically braking vehicles in the manner above referred to it frequently happens that the intensity of the brake currents varies although the brake circuits are not in any way injured. It is undesirable that such current variations occurring in normal operation cause the second brake apparatus to be actuated. For preventing such undesirable actuation of the second brake apparatus I provide means whereby the application of the second brakes to wheels is effected only when the current intensity in the associated brake circuit has been reduced to a value below the unit occurring in normal operation. Such means may be constituted by a locking device normally locking in position the element actuated by the solenoids and actuating in turn the second brake apparatus and releasing the same only after the intensity of the brake current has sunk below the above indicated predetermined limit. This may be arrived at in the arrangement illustrated in Fig. 3 by reducing the action of the solenoids tending to apply the second brakes as compared with the action of the solenoids tending to release the brakes by reducing the current intensity or number of turns in the former solenoids as compared with the values of the corresponding quantities of the latter solenoids. Such an arrangement is illustrated in Fig. 3 but may be also applied to the plant shown in Fig. 1.

The brake levers 71, 72 are provided with forks 9, 10 into which engage the hook shaped ends of levers 13, 14 pivoted in the vehicle frame at 15, 16. Springs 17, 18 tend to turn these levers into the open position while solenoids 19, 20 included in the brake circuits tend to hold them in the locked position.

As long as the intensity of the brake current is above a predetermined value as is shown in the case of the motor 2, the action of the associated solenoid 20 is so great that the lever 14 is held in locking position, the action of the spring 18 being overcome.

The lever 72 then contacts on the one hand with the stop 12 and on the other hand with the lever 14, so that it does not move in the case of normal variations of current intensity in the solenoid 64.

When the current intensity sinks below the said predetermined value as is assumed in connection with the motor 1 also the excitation of the associated solenoid 19 sinks so far that the spring action overcomes the solenoid action and the lever 13 is disengaged from the fork 9. The lever 71 is then turned clockwise by the action of the solenoid 61, not having undergone a reduction of excitation and the second brakes are applied to the wheels driven by the motor 1.

Figure 4:
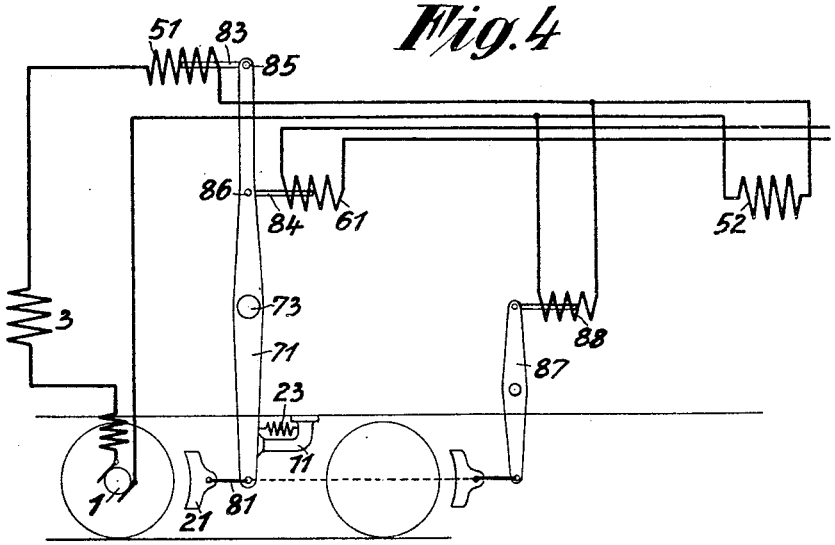
Fig. 4 illustrates a modification of the system shown in Fig. 3.

Fig. 4 shows various further arrangements all of which are for the purpose to retard the actuation of the second brakes so that they are not thrown into operation each slight reduction of the brake current but only at a considerable variation thereof. For simplifying the illustration all these arrangements are shown united in one plant although in practice in general only one of these arrangements will be utilized.

Fig. 4 shows the left half of a brake plant. In order to reduce the action of the solenoid 61 tending to bring about the application of the brakes, as compared with the action of the solenoid 51 tending to release the brakes the cores 84 and 83 respectively associated to such solenoids act on the lever 71 with a different leverage or at lever arms of different length, the one at 86 and the other at 85 the lever arm associated to the solenoid 61 being the shorter one.

The same effect may be obtained according to the invention making the solenoid 51 tending to release the second brakes with a larger number of turns than the solenoid 61 as is likewise indicated in Fig. 4.

Finally the action of the solenoid tending to apply the second brakes may be reduced by reducing the intensity of the current flowing through them as compared with the intensity of the current flowing through the other solenoids. Fig. 4 shows this for the solenoid 52 associated to the right hand brake lever not shown having connected in parallel with it a solenoid 88 which acts on the brake lever 87 which normally acts to apply the second brakes. It will be understood that the full brake current flows through the solenoid 51 but only part thereof flows through the solenoid 52, the remainder flowing through the solenoid 88. Similarly, the current flowing through the solenoid 61 will be reduced.

All of the last described arrangements may of course be applied whether the brake applying element directly actuated by the coils and cores does not directly operate the second brake apparatus, but does so through the medium of relays as above indicated.

What I claim is:

1. A brake system for electrically operated vehicles comprising two electric driving units, each driving one set of wheels, a brake apparatus comprising two parts each of which is associated to one of the said sets of wheels, each of the said electric driving units being adapted to be closed upon itself through the medium of a brake circuit, at least one coil electrically connected to each of said brake circuits, an iron core associated to each of said coils, the coil of one brake circuit and its associated core counteracting the coil of the other brake circuit and its associated core, a brake applying element associated to each of the two parts of the brake apparatus and adapted to apply brakes to the corresponding set of wheels and means for operatively connecting the two cores of the said pair of counteracting coils with each other and with one of the said brake applying elements, whereby, whenever the current intensity in the brake circuit of one electric driving unit falls below that in the brake circuit of the other electric driving unit, brakes of the part of the brake apparatus associated to the set of wheels driven by the electric driving unit, in the brake circuit of which the current intensity is smaller, are applied to the set of wheels associated to the last named electric driving unit.

2. A brake system for electrically operated vehicles comprising two electric driving units, each driving one set of wheels, a brake apparatus comprising two parts each of which is associated to one of the said sets of wheels, each of the said electric driving units being adapted to be closed upon itself through the medium of a brake circuit, two coils located at a distance from each other and electrically connected to each of said brake circuits, an iron core associated to each of said coils, the coil of one brake circuit and its associated core counteracting one coil of the other brake circuit and its associated core, a brake applying element associated to each of the two parts of the brake apparatus and adapted to apply brakes to the corresponding set of wheels and means for operatively connecting the two cores of each of the said pairs of counteracting coils with each other and with one of the said brake applying elements, whereby, whenever the current intensity in the brake circuit of one electric driving unit falls below that in the brake circuit of the other electric driving unit, brakes of the part of the brake apparatus associated to the set of wheels driven by the electric driving unit in the brake circuit of which the current intensity is smaller are applied to the set of wheels associated to the last named electric driving unit.

3. A brake system for electrically operated vehicles comprising two electric driving units, each driving one set of wheels, a brake apparatus comprising two parts each of which is associated to one of the said sets of wheels, each of the said electric driving units being adapted to be closed upon itself through the medium of a brake circuit, two coils located at a distance from each other and electrically connected in series to each of said brake circuits, an iron core associated to each of said coils, each of the coils of one brake circuit and its associated core counteracting one coil of the other brake circuit and its associated core, a brake applying element associated to each of the two parts of the brake apparatus and adapted to apply brakes to the corresponding set of wheels and means for operatively connecting the two cores of each of the said pairs of counteracting coils with each other and with one of the said brake applying elements, whereby, whenever the current intensity in the brake circuit of one electric driving unit falls below that in the brake circuit of the other electric driving unit, brakes of the part of the brake apparatus associated to the set of wheels driven by the electric driving unit, in the brake circuit of which the current intensity is smaller are applied to the set of wheels associated to the last named electric driving unit.

4. A brake system for electrically operated vehicles comprising two electric driving units, each driving one set of wheels, a brake apparatus comprising two parts each of which is associated to one of the said sets of wheels, each of the said electric driving units being adapted to be closed upon itself through the medium of a brake circuit, two coils located at a distance from each other and electrically connected to each of said brake circuits, an iron core associated to each of said coils, each of the coils of one brake circuit and its associated core counteracting one coil of the other brake circuit and its associated core, a brake applying element associated to each of the two parts of the brake apparatus and adapted to apply brakes to the corresponding set of wheels, means for operatively connecting the two cores of each of the said pairs of counteracting coils with each other and with one of the said brake applying elements, whereby, whenever the current intensity in the brake circuit of one electric driving unit falls below that in the brake circuit of the other electric driving unit, brakes of the part of the brake apparatus associated to the set of wheels driven by the electric driving unit in the brake circuit of which the current intensity is smaller are applied to the set of wheels associated to the last named electric driving unit and stops for limiting the movement of the parts of the brake apparatus in the direction of releasing the brakes.

In testimony whereof I affix my signature.

LUDWIG SPÄNGLER.